(12) United States Patent
Nissing

(10) Patent No.: US 6,716,514 B2
(45) Date of Patent: Apr. 6, 2004

(54) DISPOSABLE ARTICLE WITH ENHANCED TEXTURE

(75) Inventor: Nicholas James Nissing, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 162 days.

(21) Appl. No.: 09/957,408

(22) Filed: Sep. 20, 2001

(65) Prior Publication Data

US 2002/0013109 A1 Jan. 31, 2002

Related U.S. Application Data

(63) Continuation-in-part of application No. 09/231,567, filed on Jan. 14, 1999, now abandoned.
(60) Provisional application No. 60/073,297, filed on Jan. 26, 1998.

(51) Int. Cl.$^7$ ................................................. B32B 3/28
(52) U.S. Cl. ...................... 428/153; 428/167; 428/198; 428/211
(58) Field of Search ................................ 428/153, 167, 428/198, 211

(56) References Cited

U.S. PATENT DOCUMENTS

| | | |
|---|---|---|
| 3,301,746 A | 1/1967 | Sanford et al. |
| 3,375,156 A | 3/1968 | Edgar, Jr. |
| 3,546,056 A | 12/1970 | Thomas |
| 3,597,299 A | 8/1971 | Thomas et al. |
| 3,615,976 A | 10/1971 | Endres et al. |
| 3,650,882 A | 3/1972 | Thomas |
| 3,673,026 A | 6/1972 | Brown |
| 3,684,641 A | 8/1972 | Murphy |
| 3,695,985 A | 10/1972 | Brock et al. |
| 3,708,383 A | 1/1973 | Thomas et al. |
| 3,709,750 A | 1/1973 | Minshell |
| 3,755,062 A | 8/1973 | Schirmer |
| 3,925,127 A | 12/1975 | Yoshioka |
| 3,929,135 A | 12/1975 | Thompson |
| 3,953,638 A | 4/1976 | Kemp |
| 3,958,055 A | 5/1976 | Hadley et al. |
| 3,994,771 A | 11/1976 | Morgan et al. |
| 4,300,981 A | 11/1981 | Carstens |
| 4,324,246 A | 4/1982 | Mullane et al. |
| 4,342,314 A | 8/1982 | Radel et al. |
| 4,429,014 A | 1/1984 | Isner et al. |
| 4,440,597 A | 4/1984 | Wells et al. |
| 4,463,045 A | 7/1984 | Ahr et al. |
| 4,469,735 A | 9/1984 | Trokhan |
| 4,522,863 A | 6/1985 | Keck et al. |
| 4,525,407 A | 6/1985 | Ness |
| 4,529,480 A | 7/1985 | Trokhan |
| 4,637,819 A | 1/1987 | Ouellette et al. |

(List continued on next page.)

FOREIGN PATENT DOCUMENTS

| | | |
|---|---|---|
| EP | 0 872 206 A1 | 10/1998 |
| FR | 2355950 A1 | 1/1978 |
| GB | 1276228 | 6/1972 |
| WO | WO 91/01396 A1 | 2/1991 |

Primary Examiner—Elizabeth M. Cole
(74) Attorney, Agent, or Firm—C. Brant Cook; Vladimir Vitenberg; David M. Weirich

(57) ABSTRACT

A single- or multi-ply disposable article comprises at least one foreshortened, wet-extensible ply that has a surface topography exhibiting regions of minimum and maximum calipers comprising creping ridges, wherein the creping ridges are oriented in a first direction; and a coating bonded to the at least one foreshortened ply, the coating defining bonded regions and a plurality of unbonded regions in the ply. The minimum caliper is coincident the bonded regions, and the coating comprises a plurality of mutually parallel lines of adhesive extending in a second direction substantially perpendicular to the first direction.

17 Claims, 8 Drawing Sheets

U.S. PATENT DOCUMENTS

| | | |
|---|---|---|
| 4,637,859 A | 1/1987 | Trokhan |
| 4,661,389 A | 4/1987 | Mudge et al. |
| 4,695,422 A | 9/1987 | Curro et al. |
| 4,778,644 A | 10/1988 | Curro et al. |
| 4,839,216 A | 6/1989 | Curro et al. |
| 4,847,134 A | 7/1989 | Fahrenkrug et al. |
| 4,891,258 A | 1/1990 | Fahrenkrug |
| 4,919,756 A | 4/1990 | Sawdai |
| 5,006,394 A | 4/1991 | Baird |
| 5,073,235 A | 12/1991 | Trokhan |
| 5,223,096 A | 6/1993 | Phan et al. |
| 5,227,228 A | 7/1993 | Newell |
| 5,245,025 A | 9/1993 | Trokhan et al. |
| 5,277,761 A | 1/1994 | Phan et al. |
| 5,364,504 A | 11/1994 | Smurkoski et al. |
| 5,401,557 A | 3/1995 | Inomata et al. |
| 5,503,715 A | 4/1996 | Trokhan et al. |
| 5,506,030 A | 4/1996 | Landers et al. |
| 5,525,397 A | 6/1996 | Shizuno et al. |
| 5,529,664 A | 6/1996 | Trokhan et al. |
| 5,618,610 A | 4/1997 | Tomita et al. |
| 5,623,888 A | 4/1997 | Zafiroglu |
| 5,635,275 A | 6/1997 | Biagioli et al. |
| 5,654,076 A | 8/1997 | Trokhan et al. |
| 5,756,112 A | 5/1998 | Mackey |
| 5,958,555 A * | 9/1999 | Takeuchi et al. ............ 428/152 |
| 5,980,673 A | 11/1999 | Takeuchi et al. |
| 5,980,922 A | 11/1999 | Mackey et al. |
| 6,060,149 A | 5/2000 | Nissing et al. |
| 6,153,208 A | 11/2000 | McAtee et al. |
| 6,180,214 B1 | 1/2001 | Nissing et al. |
| 6,270,875 B1 | 8/2001 | Nissing |

\* cited by examiner

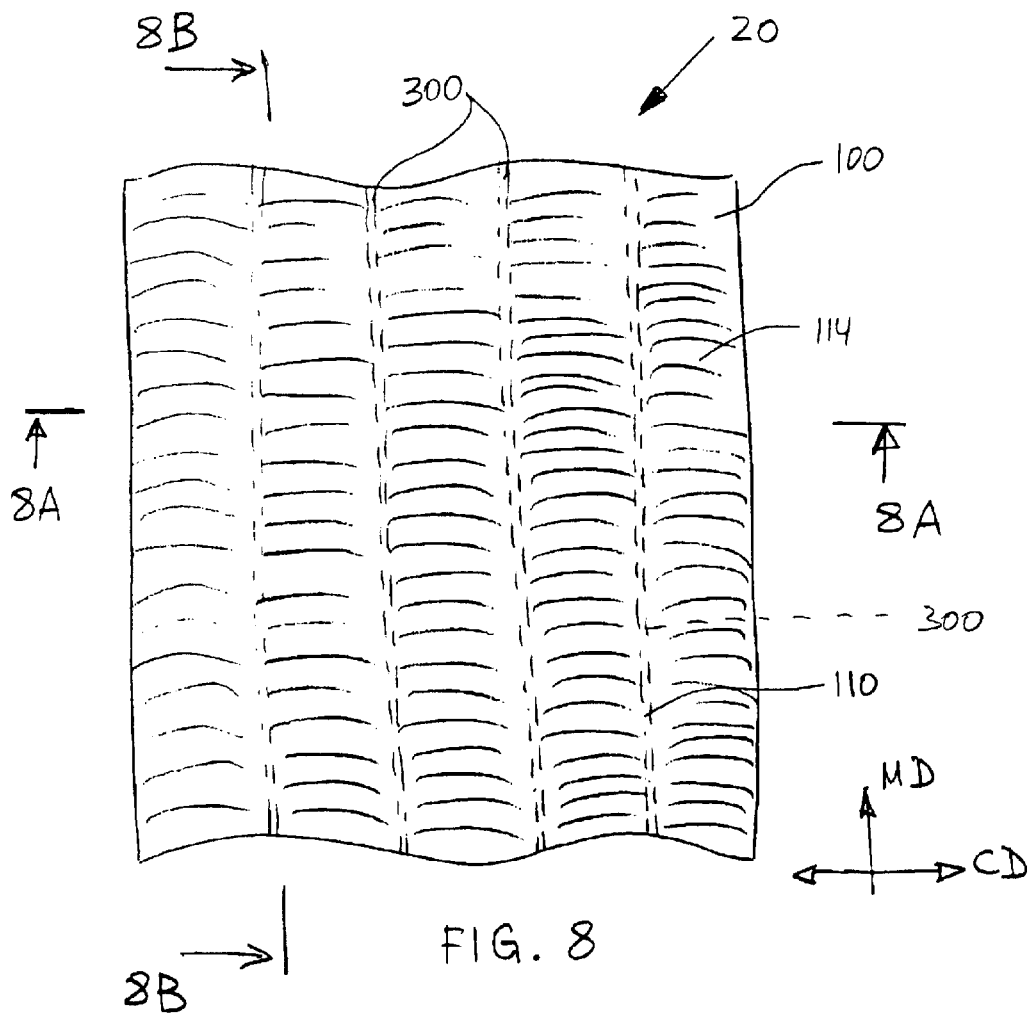
FIG. 8
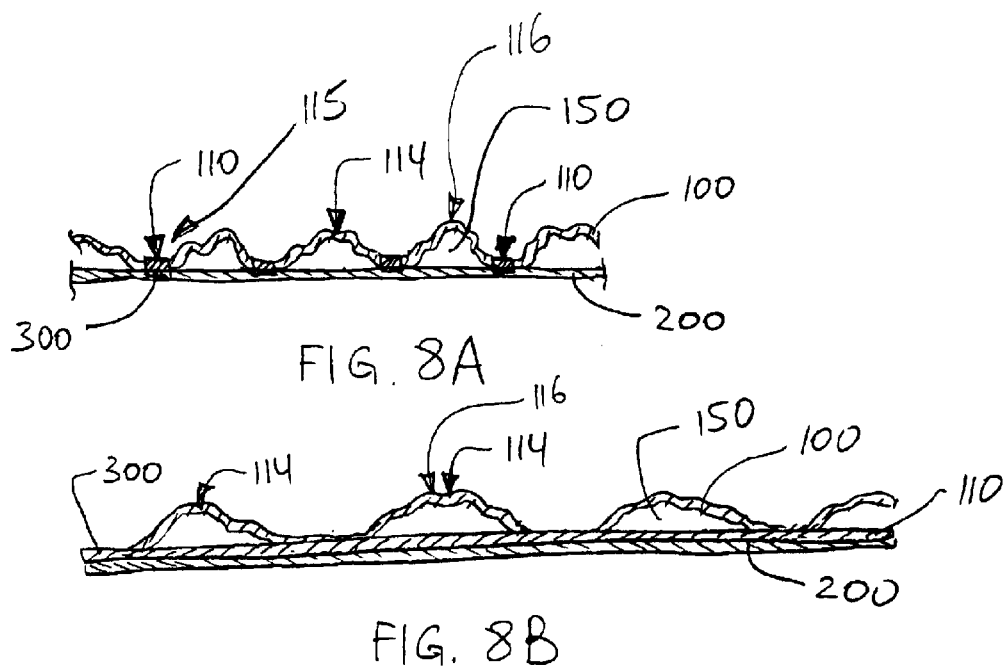
FIG. 8A
FIG. 8B

DISPOSABLE ARTICLE WITH ENHANCED TEXTURE

CROSS REFERENCE

This application is a continuation-in-part application of U.S. application Ser. No. 09/231,567, filed Jan. 14, 1999 now abandoned, which claims the benefit of U.S. Provisional Application No. 60/073,297, filed Jan. 26, 1998.

FIELD OF THE INVENTION

The present invention is related to disposable consumer articles, and more particularly to disposable articles having distinct regions of increased caliper, and methods for their manufacture.

BACKGROUND OF THE INVENTION

Disposable articles are well known in the art. Such articles typically have a substrate that includes one or more materials or plies. The examples of such articles include toilet tissue Charmin® and paper towel Bounty®, both produced and sold by the current assignee. The substrate can be pre-moistened with a wetting agent prior to use, or alternatively, can be combined with a liquid at the point of use.

Desirable features of such articles include texture, caliper (thickness) and bulk (volume per unit weight). A relatively high value of texture is desirable for aiding in cleaning of surfaces. Relatively high values of caliper and bulk are desirable for providing volume in the article for receiving and containing liquids.

One method of imparting texture and bulk to an article is by combining plies having different properties. U.S. Pat. No. 4,469,735 issued Sep. 4, 1984 to Trokhan discloses a multiple ply tissue paper product having a wet microcontracted constraining paper ply and a dry creped constrained paper ply. Portions of the constrained ply are adhered to the constraining ply. When the multiple ply product is wetted, unadhered portions of the constrained ply pucker in the Z-direction to provide texture and bulk. While the structure in U.S. Pat. No. 4,469,735 provides the advantage of texture and bulk upon wetting, it requires the use of wet microcontraction procedures on a paper machine.

Other methods of increasing bulk and texture are known, such as embossing, creping, and laminating multiple plies of embossed, creped paper. However, these methods are limited by the amount caliper can be increased without degrading other material properties such as wet/dry strength or softness. Individual plies can generally only be mechanically deformed a certain amount before the integrity of the substrate is compromised or the aesthetic and tactile properties degraded.

Therefore, known methods of increasing caliper and texture generally rely on an article structure having more than one ply or a ply with differential wet extensibility providing for increased wet caliper.

Accordingly, it would be desirable to provide a single- or multi-ply disposable article that exhibits regions of increased caliper without costly material and manufacturing costs associated with embossing, laminating, and similar processes.

Additionally, it would be desirable to provide a single- or multi-ply disposable having a surface topography with significant differences in maximum and minimum calipers measured within the same web.

Additionally, it would be desirable to provide a multi-ply disposable article wherein the plies have differential extensibility after wetting.

Further, it would be desirable to provide a multi-ply disposable article wherein the plies have substantially equal extensibility after wetting.

SUMMARY OF THE INVENTION

A disposable fibrous article comprises at least one foreshortened, wet-extensible ply having a surface topography exhibiting regions of minimum and maximum calipers and a coating bonded to the at least one foreshortened ply. The coating defines bonded regions and a plurality of unbonded regions in the at least one foreshortened ply. The regions of minimum and maximum calipers comprise creping ridges oriented in a first direction. The minimum caliper is coincident the bonded regions. The coating comprises a plurality of mutually parallel lines of adhesive extending in a second direction substantially perpendicular to the first direction. One or more plies can be apertured. The plies can have differential extensibility or substantially equal extensibility. A ratio of wet caliper to dry caliper can be greater than at least 1.1.

BRIEF DESCRIPTION OF THE DRAWINGS

FIG. 8 is a schematic plan view of an embodiment of the article of the present invention, comprising linear pattern of adhesive.

FIG. 8A is a schematic cross-sectional view taken along lines 8A—8A of FIG. 8 and showing the article of the present invention after wetting, wherein the article comprises two plies, one of the plies being extensible.

FIG. 8B is a schematic cross-sectional view taken along lines 8B—8B of FIG. 8 and showing the article after wetting.

DETAILED DESCRIPTION OF THE INVENTION

Figure 1:
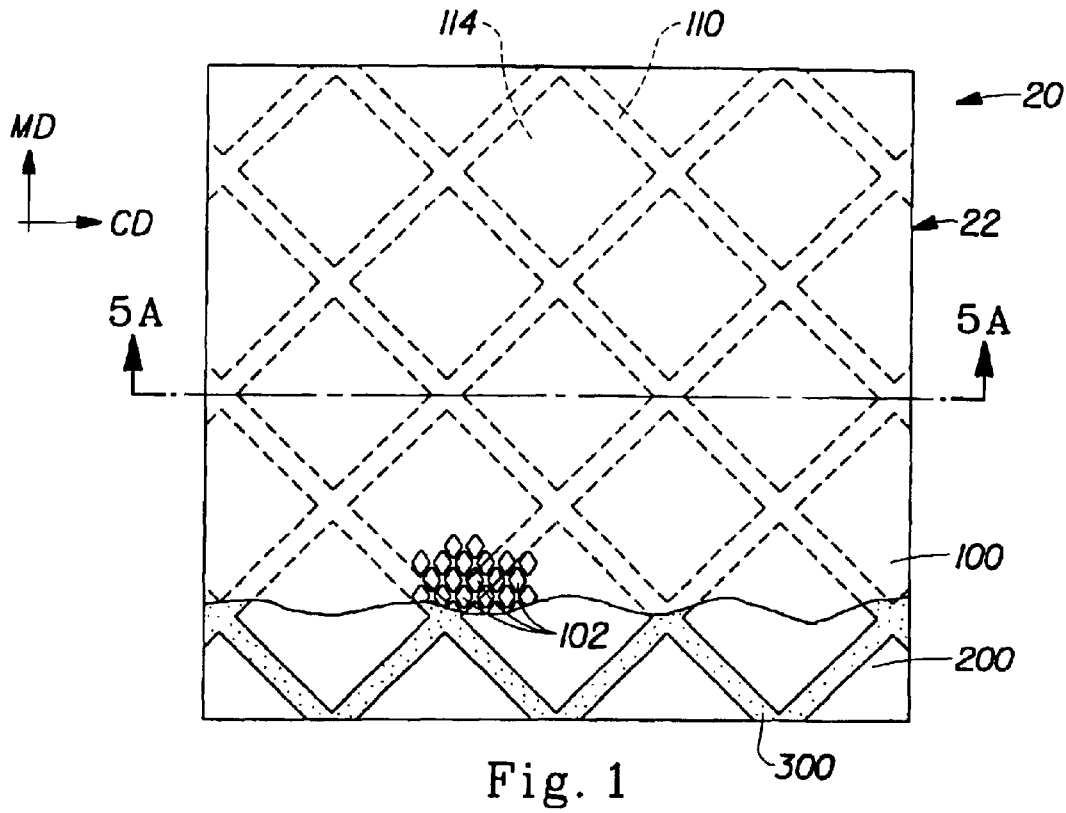
FIG. 1 is a schematic plan view of one embodiment of an article of the present invention, comprising an extensible first ply and a less extensible second ply, with the first ply shown facing the viewer, and with a portion of the first ply shown cut away to show a continuous network of generally parallel sets of intersecting lines of adhesive which serve to bond the first ply to the second ply, the bonded region defining generally diamond-shaped unbonded regions.

A disposable article 20 of the present invention comprises a substrate designated generally by reference numeral 22. As is shown in several figures, the substrate 22 comprises a first ply 100 and a second ply 200. The first ply 100 is preferably extensible when the first ply is wetted. By "extensible" it is meant that a material has a tendency to elongate in at least one direction when wetted. In general, "wetted" refers to wetting with aqueous solutions, including water, capable of inducing extension in the extensible first ply. For example, water relaxes the crepe in foreshortened web, thereby causing an extension of the web in at least one direction in the plane of the paper. Steam can also be used to wet the article 20 or its individual plies in order to cause at one of the plies to elongate in at least one direction.

While not wishing to bound by theory, I believe that the relaxation of crepe may be a result of the loss of hydrogen bonds within the web structure due to the presence of water. However, any fluid, mixture, or solution which could cause this crepe relaxation would be considered to "wet" the article 20. The second ply 200 may be equally extensible or relatively less extensible when wetted than the first ply 100. Extensibility is measured according to the "Wet Extensibility Test" described below, and is reported as a percentage.

While it is desirable that in some embodiments the first ply 100 be wet extensible, and second ply 200 be less extensible, it is not necessary to realize the benefits of the present invention that the various plies have differing wet or dry extensibilities. As disclosed fully below, the process of the present invention results in an article having increased caliper independent of the individual or differential extensibilities of the component plies. Wet extensibility of the first ply 100 joined to a less extensible second ply 200 may improve a wet caliper of the article 20, but even a single ply will experience increased wet caliper when formed according to the method of the present invention.

Figure 2:
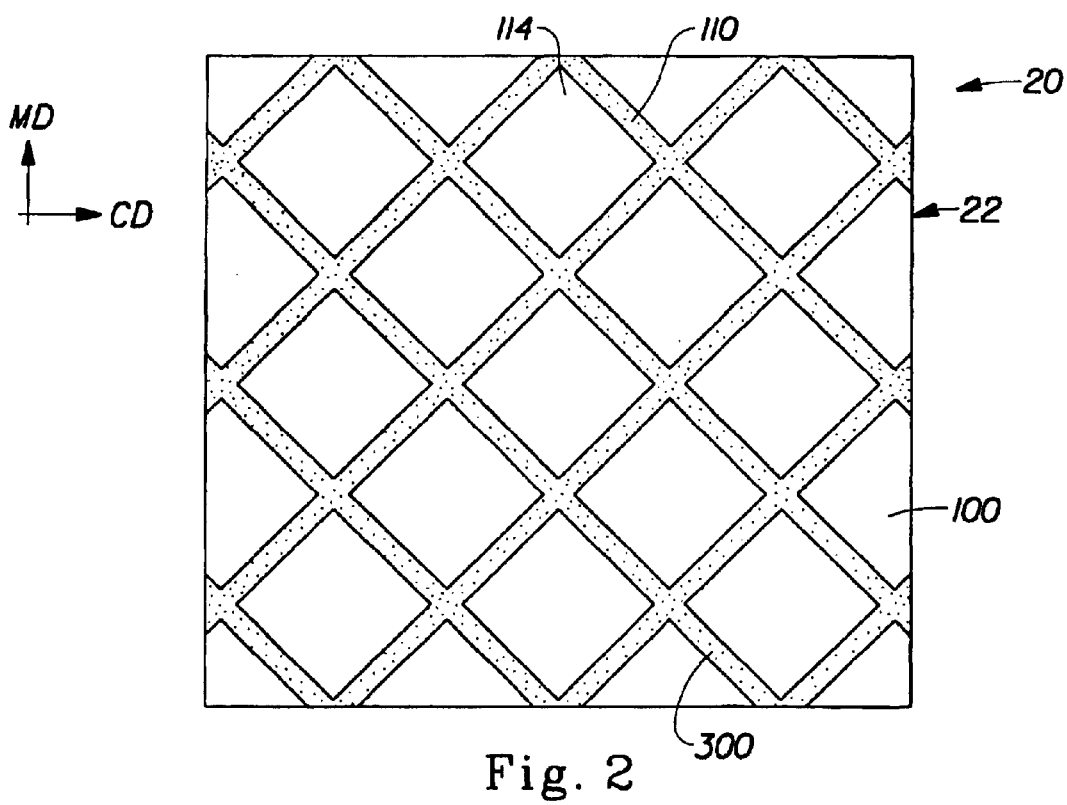
FIG. 2 is a schematic plan view of another embodiment of the article of the present invention, comprising a single ply.

FIG. 2 shows a single-ply embodiment of the disposable article 20. The single-ply substrate 22 may comprise any material suitable for a disposable article, including, but not limited to, cellulosic fibers, starch fibers, natural or synthetic woven materials, natural or synthetic nonwoven materials, foams, battings, and the like. A coating 300, such as, for example, an adhesive or hot melt adhesive, can be applied to a single ply and allowed to cure. The cured adhesive forms bonded regions 110 and unbonded regions 114, described more fully below. If the ply or plies in the article 20 comprises a wet-extensible web, such as, for example, a creped web, the coating serves as a constraining element to facilitate wet caliper increase in a predetermined pattern, as described herein.

Figure 10:
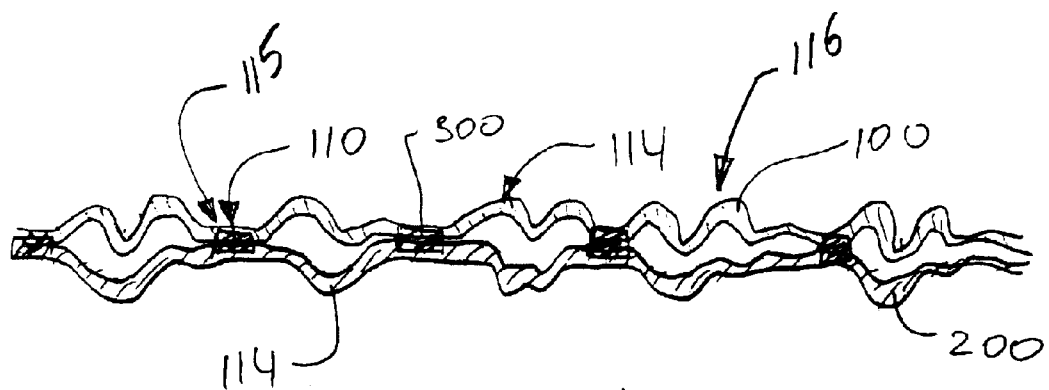
FIG. 10 is a schematic cross-sectional view of the article of the present invention, comprising two plies, after wetting, wherein both plies are extensible.

In a multi-ply embodiment, such as shown in FIGS. 1–5C, 8–8B, and 10, selected portions of the first ply 100 are joined, directly or indirectly, to the second ply 200 to inhibit wet extension of the first ply in the plane of the first ply. In FIG. 1, selected portions of the first ply 100 are joined to the second ply 200 to provide bonded regions 110 and unbonded regions 114. In FIG. 1, the bonded regions 110 comprise a continuous network of intersecting lines forming generally diamond-shaped unbonded regions 114. In FIGS. 8 and 8B, the bonded regions 110 comprise a pattern of linear stripes forming therebetween unbonded regions 114. The article 20 has minimum caliper regions 115 (or, simply, minimum caliper 115) and maximum caliper regions 116 (or, simply, maximum caliper 116), as best shown in FIGS. 8A and 10. The minimum caliper 115 is coincident the bonded regions 110 of the article 20. The maximum caliper 116 extends intermediate the bonded regions 110.

The width and spacing of the lines of adhesive comprising bonded regions 110 may be adjusted to provide the desired pattern of the unbonded regions 114. A coating 300 may comprise any suitable pattern, resulting in unbonded regions of virtually limitless shapes, including, for example, squares, rectangles, triangles, longitudinal stripes, and other regular, irregular, and random shapes. Further, it is contemplated that the coating can be applied in localized, discrete, smaller areas where caliper generation is desired. The coating may also be applied to portions of the article forming a plurality of discrete bonded regions 110. The coating 300 can be selected from the group consisting of any suitable adhesives, thermoplastic adhesives, latexes, or any combination thereof.

If the first ply 100 is wet-extensible, there is a tendency of the first ply 100 to expand along one or more directions in the plane of the first ply 100 when the article 20 is wetted. However, in the embodiments in which the second ply 200 is relatively less wet-extensible, because of the relatively lower wet-extensibility of the second ply 200, the second ply 200 constrains extension of the first ply 100 in the plane of the first ply 100. As a result, the unbonded regions 114 of the first ply 100 deform, and/or deplane, such as by buckling or puckering in the Z-direction perpendicular to the plane of the first ply 100, as best shown in FIGS. 5A, 5B, 8A, and 8B.

Figure 5A:
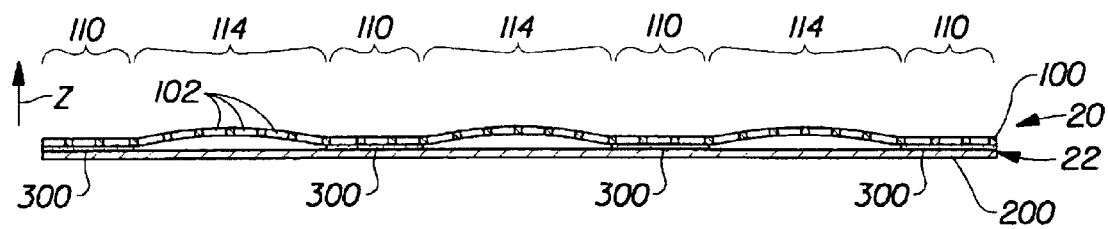
FIG. 5A is a schematic cross-sectional view of the article of the present invention taken along the lines 5A—5A in FIG. 1, and showing the article prior to wetting.
Figure 5B:
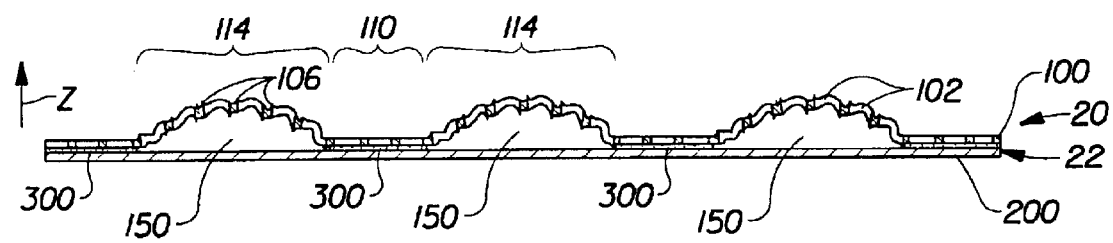
FIG. 5B is a schematic cross-sectional view taken along the lines 5A—5A in FIG. 1, and showing the article after wetting.

In FIG. 5A, showing the article 20 prior to wetting, the article 20 is generally flat. FIG. 5B shows plane deformation of the first ply 100 upon wetting of the first ply 100. The deformation of the wetted first ply 100 provides the ply 100 with elevated portions 114 which increase the wet texture, wet caliper (thickness) and wet bulk of the article 20. The elevated portions 114 also provide pockets 150 (FIGS. 5B, 8A and 8B) disposed between the unbonded (elevated) portions 114 of the first ply 100 and the underlying portions of the second ply 200. These pockets are believed to facilitate absorption and retention of fluids when the article 20 is used.

The wet caliper to dry caliper ratio is a measure of the thickness of the article 20, when wetted, relative to the thickness of the dry article 20 prior to wetting. In particular, the article 20 can have a wet caliper to dry caliper ratio which is greater than 1.0, specifically at least about 1.1, and more specifically at least about 1.2. The wet caliper to dry caliper ratio is measured according to the procedure provided below.

Figure 4:
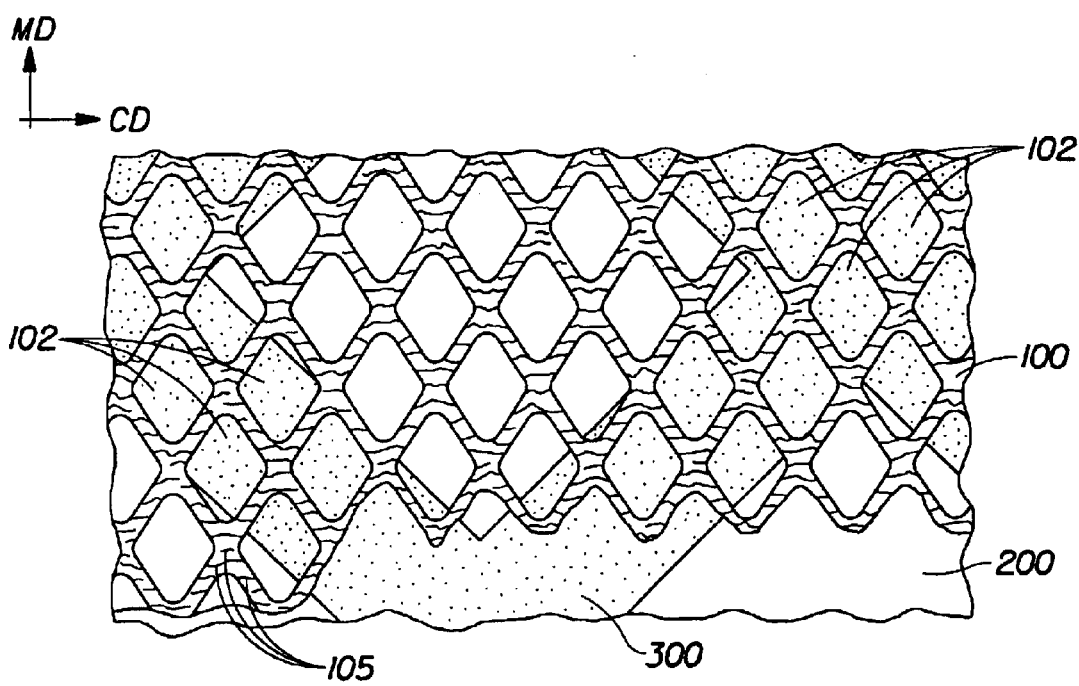
FIG. 4 is a schematic plan view of a portion of the article shown in FIG. 3, FIG. 4 being enlarged relative to FIG. 3 to illustrate the creping ridges in the apertured ply.
Figure 11:
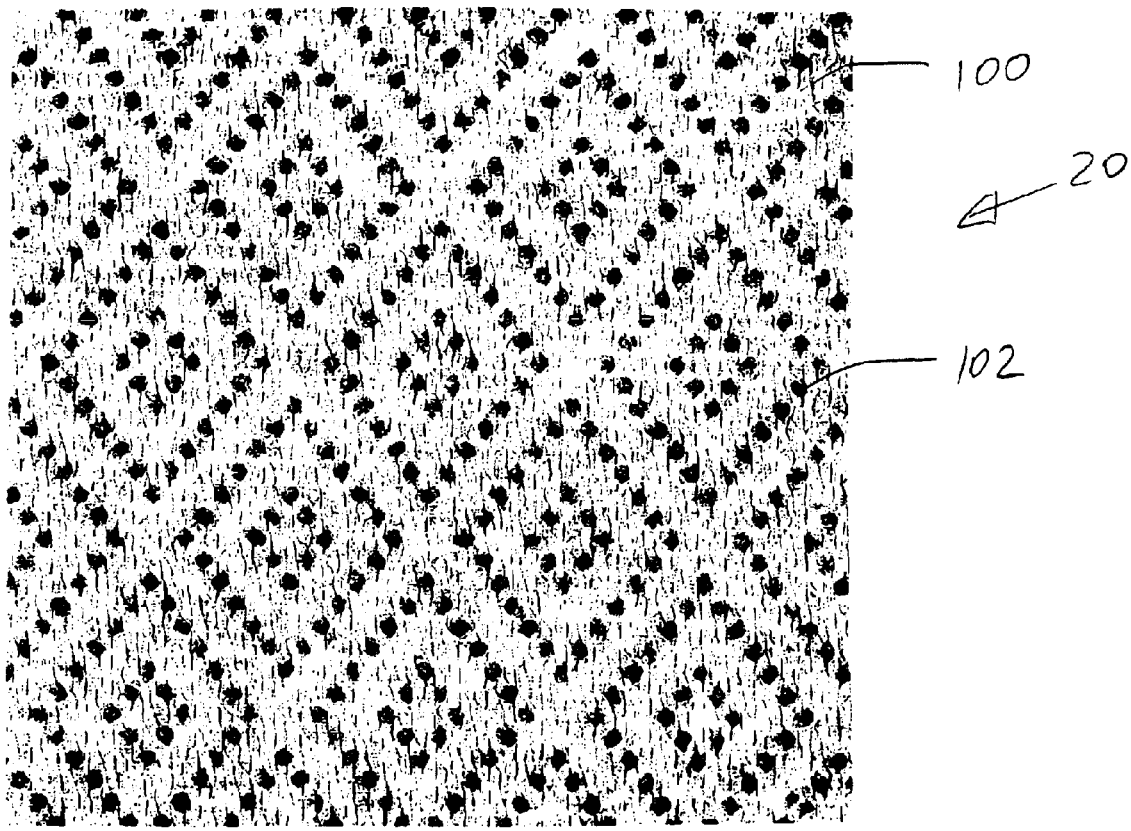
FIG. 11 is a plan view of an apertured ply that can be used in the article of the present invention.

In embodiments shown in FIGS. 4 and 11, the first ply 100 comprises a plurality of apertures 102 which extend through the thickness of the first ply 100. In FIG. 4, the apertures 102 are shown on only a portion of the first ply 100 for clarity. As explained above, the deformation of the wetted first ply 100 provides the ply 100 with elevated portions 114 (FIG. 5B) which increase the wet texture, wet caliper (thickness) and wet bulk of the article 20. The apertures 102 provide a flow path through which liquids can enter the pockets 150 formed between elevated portions 114 of the first ply 100 and portions of the second ply 200.

Additionally, if the article 20 is used with, or includes, a lathering agent, such as, for example, a surfactant, the apertures 102 can aid in the incorporation of air during the lathering process, thereby improving lather generation. For instance, a portion of the article 20 can be coated or otherwise treated with a surfactant composition. The article 20 can be wetted with water to activate the surfactant, and the airflow generated through the apertures 102 during use of the article can help to generate lather.

The size and number of the apertures 102 can influence the speed of lather generation and the quality of lather produced. While not wishing to be bound by theory, I believe that a relatively small number of relatively large apertures 102 will tend to reduce the time required to generate lather, but will yield relatively large lather bubbles with a translucent appearance. On the other hand, a relatively larger number of relatively smaller apertures 102 will tend to reduce bubble size, thereby increasing lather creaminess and opacity, but at the expense of increasing the time required to generate lather.

Figure 3:
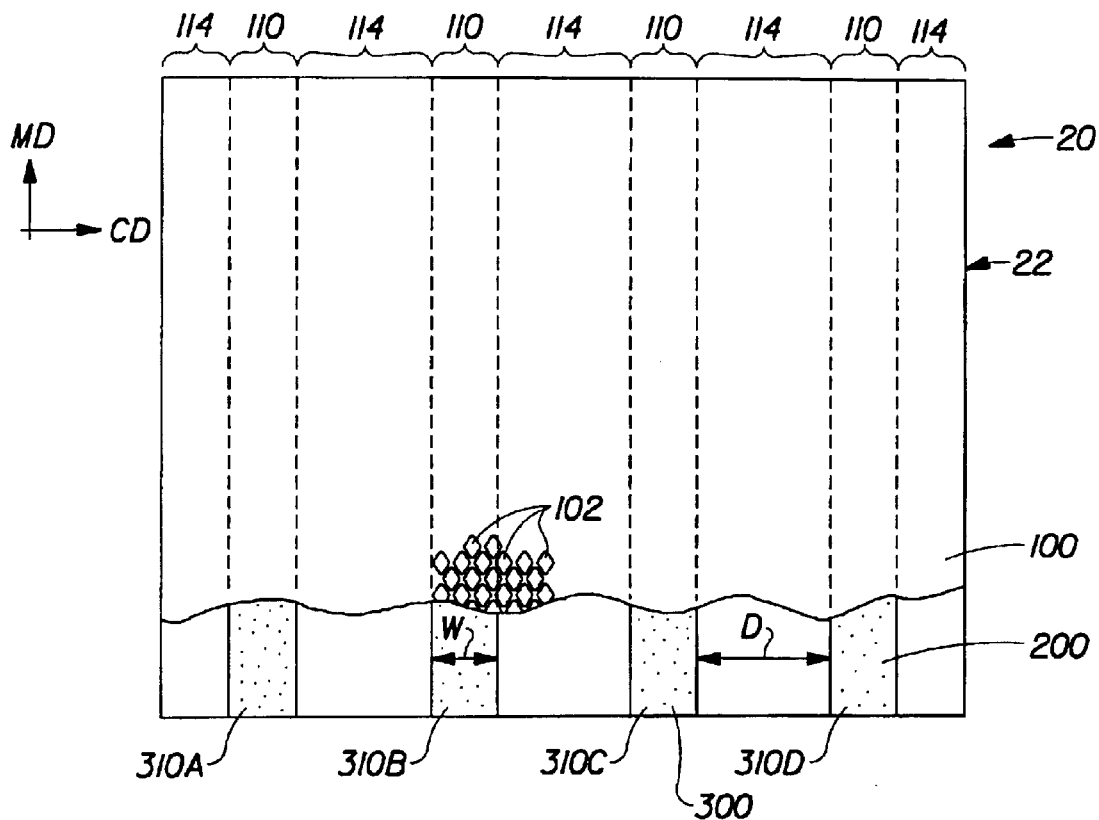
FIG. 3 is a schematic plan view of another embodiment of the article of the present invention, the article including an apertured ply which is shown facing the viewer, and with a portion of the apertured ply shown cut away to show generally parallel, spaced apart zones of adhesive extending generally parallel to a machine direction.

In some embodiments, a combined area of the apertures 102 can comprise between about 5 and about 75 percent, and more specifically from about 8 to about 30 percent of the total surface area of the first ply 100. The apertures 102 shown in FIGS. 1, 3 and 4 are bilaterally staggered (i.e., staggered in both the machine and cross machine directions) in a repeating, nonrandom pattern, while the apertures 102 shown in FIG. 11 are not bilaterally staggered. Instead, in FIG. 11, a plurality of the apertures 102 comprises a diamond-shape pattern.

In one embodiment, the first ply 100 comprises a web which is dry-creped at 30 percent (i.e., 30 percent foreshortening), and has about 40 to about 50 apertures 102 per square inch, the apertures 102 having a length of from about 0.10 to about 0.18 inches and a width of from about 0.07 to about 0.15 inches, and a distance between adjacent apertures of from about 0.05 to about 0.08 inches.

Another advantage is recognized when the first ply 100 is apertured. As shown in FIG. 5B, in addition to the formation of elevated ridges 120, the wet extension of first ply 100 around apertures 102 forms what can best be described as cusps 106, or surface irregularities formed by the apertures 102. The cusps 106 provide added texture to the surface of article 22 on the side of apertured first surface 100. This added texture may be modified as needed by adjusting the size and spacing of apertures 102.

Figure 5C:
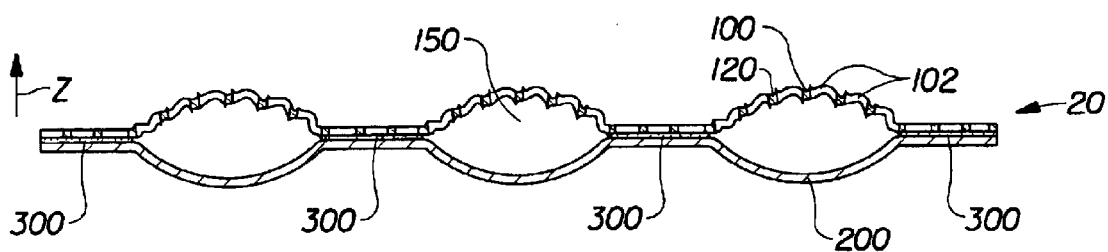
FIG. 5C is a schematic cross-sectional view of another embodiment of the article of the present invention, showing the article after wetting.

As shown in FIG. 5C, in a two-ply embodiment, both plies can experience Z-direction caliper increase in the unbonded regions of the substrate. Such an embodiment can be beneficial if the second ply 200 comprises a nonwoven material. For certain patterns of coating 300, this caliper increase in the nonwoven ply causes the substrate to have a soft, smooth, and aesthetically-pleasing quilted look and feel. This increased caliper, surface topography, texture and bulk may be induced independent of the wet-extensible properties of the individual substrates, and, in fact, is induced in the dry state. Therefore, certain dry article applications may benefit from articles prepared according to the present invention.

By way of example, application of an ethylene vinyl acetate (EVA) hot melt adhesive may increase in caliper between about 10–20% after a post-lamination heat treatment. One suitable adhesive is a hot melt adhesive commercially available as H1382-01 from Ato Findley Adhesives of Wauwatosa, Wis. To effect contraction, the article (either single- or multi-ply) having a coating 300 is allowed to equilibrate to room temperature to ensure that the adhesive has set. Afterwards, raising the temperature to about 107 degrees Celsius for about 20 seconds is believed to be sufficient to initiate contraction of the coating 300. This step may be performed in an oven, while the article 20 is not under tension. In a similar manner to the aforementioned buckling of the wet extensible creped web out of the plane of the article, the contraction of the coating 300 also causes the ply or plies to buckle out of the plane of the article 20, thereby resulting in increased caliper.

While not wishing to be bound by theory, I believe that the surface area of the substrate, for example, the nonwoven and/or web ply, do not significantly change. However, the coating 300 shrinks by a measurable amount, in some cases approximately 5%. Therefore, this reduced surface area forces the attached ply or plies to buckle out of the plane of the article 20.

Referring to the components of the article 20 in more detail, suitable materials from which the first ply 100 can be formed include foreshortened (such as by creping) wetlaid webs. Other suitable materials can include, without limitation, woven materials, nonwoven materials, foams, battings, and the like. The fibers or filaments of the first ply 100 can be natural (e.g. cellulosic fibers such as wood pulp fibers, cotton linters, rayon, starch, and bagasse fibers) or synthetic (e.g. polyolefins, polyamides or polyesters), or combinations thereof.

The first ply 100 can be constructed to have a wet extensibility of at least about 4 percent, more specifically at least about 10 percent, and still more specifically at least about 20 percent. In one embodiment, the first ply 100 has a wet extensibility of at least about 30 percent. The difference between the wet extensibility of the first ply 100 and the wet extensibility of the second ply 200 (the wet extensibility of the second ply 200 being subtracted from the wet extensibility of the first ply) can be at least about 4 percent, more specifically at least about 10 percent, and even more specifically at least about 30 percent.

Wet extensibility can be due to relaxation of crepe-induced foreshortening. Therefore, the first ply 100 can comprise a wetlaid web of cellulosic wood pulp fibers which is foreshortened at least about 4 percent, more specifically at least about 10 percent, and still more specifically at least about 20 percent. In one embodiment the web was foreshortened 35 percent by dry creping off a Yankee dryer during papermaking. Referring to FIG. 4, the first ply 100 is shown comprising crepe ridges 105 corresponding to the foreshortening of the first ply 100. The machine direction corresponds to the direction of manufacture of the web of first ply 100, and the cross-machine direction is perpendicular to the machine direction and lies in the plane of the web being made. The crepe ridges 105 are generally perpendicular to the machine direction, and generally parallel to the cross-machine direction of the web of first ply 100.

The web of the first ply 100 can have a basis weight of between about 15 to about 65 grams per square meter. In one embodiment, the basis weight of the first ply 100 is between about 25 to about 45 grams per square meter, and more specifically between about 32 to about 35 grams per square meter.

While not wishing to be bound by theory, I believe that the web strength can significantly alter the overall appearance of the complete article 20 of the present invention. The amount of crepe input to the first ply 100 is directly proportional to the amount of planar expansion and thereby the amount of caliper generated. However, if the wet strength of the web is insufficient, the "buckles" will collapse to form a more "wrinkled" product. Therefore both crepe and wet strength can be adjusted to provide a precise amount of texture—based on the intended use of the article 20. Specifically, wet burst measurements (measured by a Thwing-Albert Burst tester model number 1300-77 using a ⅝-inch diameter ball) are between 100 and 1200 grams per ply, more specifically, between 300 and 700 grams per ply, and still more specifically between 300 and 450 grams per ply.

In another embodiment, first ply 100 comprises an apertured wetlaid web of cellulosic wood pulp fibers. Apertures 102 can be formed in the first ply 100 in any suitable manner. For instance, the apertures 102 can be formed in the first ply 100 during formation of the web of the first ply 100, or alternatively, after the web of the first ply 100 is manufactured. In one embodiment, the first ply 100 is produced according to the teachings of one or more of the following U.S. Patents, which Patents are incorporated herein by reference: U.S. Pat. No. 5,245,025 issued Sep. 14, 1993 to Trokhan et al.; U.S. Pat. No. 5,277,761 issued Jan. 11, 1994 to Phan et al.; and U.S. Pat. No. 5,654,076 issued Aug. 5, 1997 to Trokhan et al. In particular, U.S. Pat. No. 5,277,761 at Column 10 discloses formation of a web having apertures. Commonly assigned patent application titled "Pseudo-Apertured Fibrous Structure" filed in the name of Lois Forde-Kohler on Sep. 04, 2001, Attn. Case Number 8671, is incorporated herein by reference. This patent application discloses a multi-density fibrous structure comprising a plurality of discrete pseudo-apertures disposed therein in a non-random and repeating pattern. The pseudo-apertures have individual areas greater than about 3 square millimeters and a basis weight from about 0.1 to about 5 gram per square meter. The pseudo-apertures can have their individual areas greater than about 6 square millimeters. The fibrous structure can have from about 9,000 to about 90,000 pseudo-apertures per square meter.

Prior to wetting, the creped first ply 100 can have between about 4 and about 300 apertures 102 per square inch, and more specifically between about 4 and about 100 apertures 102 per square inch. Wetting a creped web causes the web, if unrestrained, to expand in at least one direction, such as the machine direction, so that the number of apertures 102 per square inch after wetting can be smaller than the number of apertures per square inch prior to wetting. Similarly, when apertures are formed in a web, and the web is subsequently creped, the number of apertures per square inch prior to creping will be smaller than the number of apertures per square inch after creping. Accordingly references to web dimensions refer to dimensions after creping and prior to wetting.

The web is manufactured by first forming an aqueous papermaking furnish. The furnish comprises papermaking fibers, and can further comprise various additives. U.S. Pat. No. 5,223,096 issued Jun. 29, 1993 to Phan et al. is incorporated herein by reference for the purpose of disclosing various wood pulps and papermaking additives.

A suitable web for making the first ply 100 can be manufactured according to the following description. A papermaking furnish is prepared from water and highly refined Kraft pulp derived from northern softwoods (NSK), the paper furnish having a fiber consistency of about 0.2 percent (dry fiber weight divided by the total weight of the furnish equals 0.002). Additionally, a papermaking furnish can be prepared from water and chemical thermomechanical pulp (CTMP) having a fiber consistency of about 0.2 percent. The fibers can be combined in a ratio of about 80% NSK to about 20% CTMP. A dry strength additive such as carboxymethyl cellulose (CMC) is added to the 100% NSK furnish in the amount of about 6 pounds of CMC solids per ton of dry papermaking fibers. A wet strength additive such as Kymene 557H (available from Hercules, Inc. of Wilmington, Del.) is added to the furnish in the amount of about 26.5 pounds of Kymene solids per ton of dry papermaking fibers.

Figure 6:
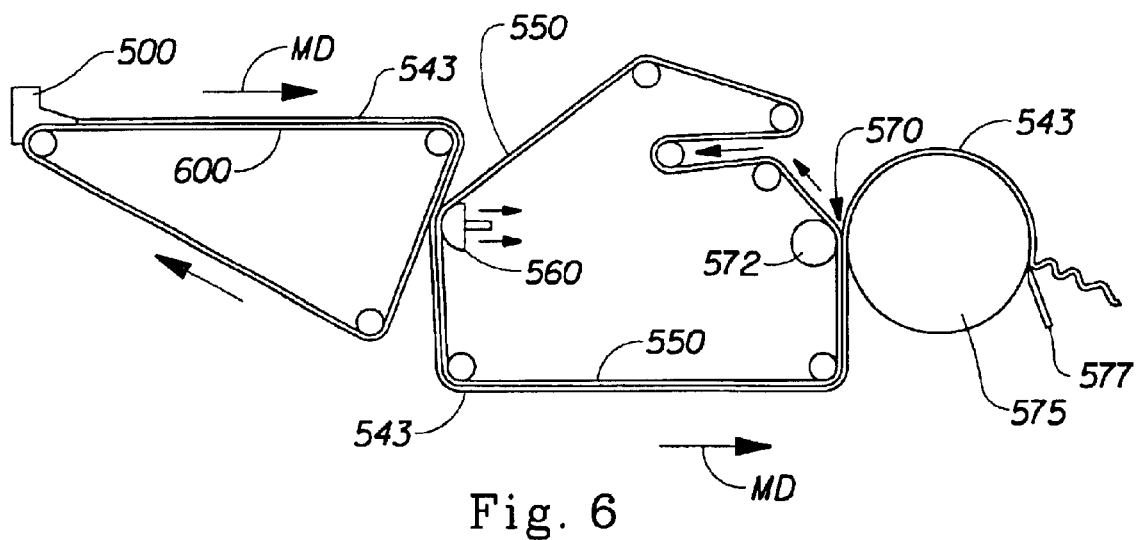
FIG. 6 is a schematic view of a paper machine which can be used to make a cellulosic paper web.

Referring to FIG. 6, the furnish is deposited from a headbox 500 of a papermaking machine to a forming element 600 at a fiber consistency of about 0.2 percent. The forming element 600 is in the form of a continuous belt in FIG. 6. The slurry of papermaking fibers is deposited on the forming element 600, and water is drained from the slurry through the forming element 600 to form an embryonic web of papermaking fibers designated by reference numeral 543 in FIG. 6.

Figure 7:
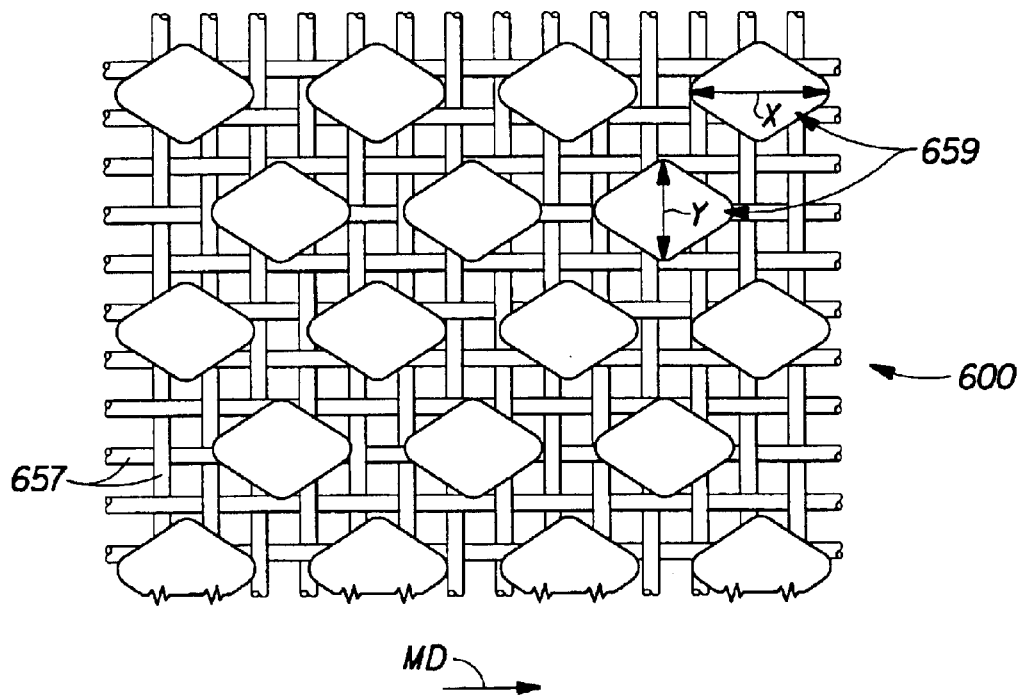
FIG. 7 is a schematic plan view of a forming element which can be used to form a cellulosic web with apertures.

In FIG. 7, the forming element 600 has two mutually opposed faces. The face which is shown in FIG. 7 is the face which contacts the papermaking fibers of the web being formed. A description of a forming element of the type shown in FIG. 7 is provided in the above referenced U.S. Pat. Nos. 5,245,025; 5,277,761; and 5,654,076, the disclosures of which are incorporated herein by reference.

The forming element 600 has flow restriction members in the form of resin protuberances 659. The forming element 600 shown comprises a patterned array of protuberances 659 joined to a reinforcing structure 657, which may comprise a foraminous element, such as a woven screen or other apertured framework. The protuberances 659 extend outwardly in the Z-direction from the reinforcing structure 657.

As an example, and without limiting the present invention, a suitable forming element 600 has about 14 protuberances 659 per square inch of surface of the forming element 600, with the protuberances 659 covering about 14 percent of the surface of the forming element 600, as viewed in FIG. 7, and the protuberances extending about 0.025 inches above the surface of the reinforcing structure 657. The protuberances can have a machine direction length X of about 0.15 inches and a cross machine direction width Y of about 0.9 inches.

The reinforcing structure 657 is substantially fluid pervious, while the protuberances 659 are substantially fluid impervious. Accordingly, as the liquid in the papermaking furnish drains through the forming element, the papermaking fibers in the furnish will be retained on the reinforcing structure 657, leaving apertures in the embryonic web 543 corresponding generally in size, shape and location to the size, shape and location of the protuberances 659.

As shown in FIG. 6, the embryonic web 543 is transferred to a through-air-drying belt 550 with the aid of a vacuum pick-up shoe 560. The web 543 is transferred to the belt 550 at a fiber consistency of about 4 percent. The web 543 is carried on the felt 550 to a nip 570 formed between a vacuum pressure roll 572 and a Yankee dryer drum 575. The web 543 is dried on the Yankee drum 575 to a fiber consistency of about 96 percent, at which point the web is creped from the Yankee drum 575 with a doctor blade 577. The web is wound on a reel at a rate (lineal feet per second) which is slower than the surface speed of the Yankee drum to foreshorten the web about by the desired amount. The foreshortened web can have a basis weight of from about 30 to 55 grams per square meter, and a thickness of about 12 to 16 mils (0.012 to 0.016 inch) as measured with a confining pressure of 95 grams per square inch and a load foot having a diameter of 2 inches.

In a multi-ply article, the first ply 100 is joined to the second ply 200 to constrain extension of selected portions of the first ply 100 when the first ply is wetted. The second ply 200 may have a lower wet extensibility than that of the first ply 100.

Figure 9:
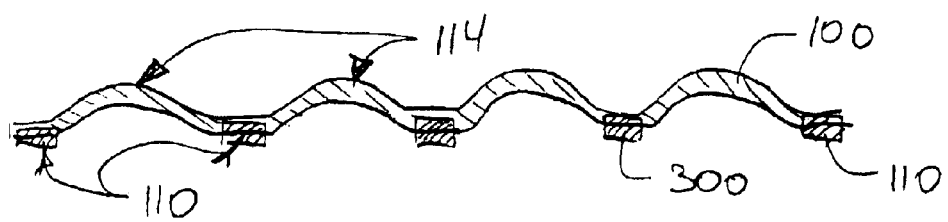
FIG. 9 is a schematic cross-sectional view of an embodiment of the article of the present invention, comprising a single ply.

In another embodiment, the second ply 200 is not used to constrain the extension of the first ply 100. Instead, the coating 300 may be used to constrain the extension of the first ply 100 such that the crepe extension upon wetting creates a structure which puckers in the Z direction, as shown in FIG. 9. In such an embodiment, the first and second plies 100, 200 may have substantially equal wet extensibility, of at least about 10%, more specifically at least about 20%, and still more specifically at least about 30%. As used herein, the term "substantially equal (wet) extensibility" refers to extensibilities of two or more plies comprising the article 20, wherein the difference in said extensibilities is no greater than about 4%.

Suitable materials from which the second ply 200 can be formed include woven materials, nonwoven materials, foams, battings, and the like. Particularly preferred materials are nonwoven webs having fibers or filaments distributed randomly as in "air-laying" or certain "wet-laying" processes, or with a degree of orientation, as in certain "wet-laying" and "carding" processes.

One material from which the second ply 200 can be formed is a nonwoven web formed by hydroentanglement of fibers. As an example, a suitable hydroentangled web is a nonwoven, hydroentangled web comprising about 50 percent by weight rayon fibers and about 50 percent by weight polyester fibers, and having a basis weight of about 62 grams per square meter. A suitable hydroentangled nonwoven web is commercially available from PGI Nonwovens of Benson, N.C. under the designation Chicopee 9931.

In the present invention, a wet-laid cellulosic web may be beneficial. Additionally, if it is desired that the extensibility of the second ply is less than that of the first ply, the second ply can be dry creped to comprise approximately 10% foreshortening. The basis weight of the second ply 200 is between about 20 gsm and about 30 gsm, and the caliper is between about 12 to 20 mils (0.012 to 0.020 inch) as measured with a confining pressure of 95 grams per square inch and a load foot having a diameter of 2 inches.

The first ply 100 and the second ply 200 can be joined using any suitable adhesive. The adhesive can be printed, extruded, or otherwise deposited to at least one of the plies, as one skilled in the art will recognize. In an extrusion process, the nozzles can have (individual) opening of about 0.02 inches and can be spaced from about 0.2 to about 2.0 inches apart, and more specifically from about 0.5 to about 1.5 inches apart form one another. From about 1 gram per square meter (gsm) to about 25 gsm, and more specifically from about 4 gsm to about 15 gsm of adhesive can be extruded onto the product in this manner. The adhesive can be water-insoluble so that the article 20 can be wetted with water without delamination of the first and second plies 100, 200. The adhesive is preferably also surfactant tolerant. By "surfactant tolerant" it is meant that the bonding characteristics of the adhesive are not degraded by the presence of surfactants. Suitable adhesives include EVA-based hot melt adhesives. As an example, one suitable adhesive is a hot melt adhesive commercially available as H1382-01 from Ato Findley Adhesives of Wauwatos, Wis.

With reference to FIGS. 8–10, the hot melt adhesive can be applied to the second ply 200 in a pattern defining a plurality of unbonded regions 114. The hot melt adhesive can be applied in lines having a width of from about 0.005 inches to about 0.5 inches, preferably from about 0.01 inches to about 0.07 inches.

The wet extensibility of a ply, such as the ply 100 or the ply 200, is determined using the following procedure. Samples are conditioned at 70 degrees Fahrenheit and 50 percent relative humidity for two hours prior to testing.

First, the direction of greatest wet extensibility in the plane of the ply is determined. For dry creped webs, this direction will be parallel to the machine direction, and generally perpendicular to the crepe ridges.

If the direction of greatest wet extensibility is not known, the direction can be determined by cutting seven samples from a sheet with sample lengths oriented between 0 degrees and 90 degrees, inclusive, with respect to a reference line drawn on the sheet. The samples are then measured as set forth below to determine the direction of greatest wet extensibility.

Once the direction of the greatest wet extensibility is determined, 8 samples are cut to have a length of about 7 inches measured parallel to the direction of greatest wet extensibility, and a width of at least 0.5 inches, and more specifically at least 1.0 inch. The samples are cut from unbonded portions of the plies 100 and 200, or, if unbonded portions having the above dimensions cannot be cut from the article 20, then samples are cut from the first and second plies 100 and 200 prior to bonding the plies 100, 200 together. Two marks are placed on each sample, such as with an ink pen. The marks are spaced apart 5 inches as measured parallel to the direction of greatest wet extensibility. This 5-inch spacing is the initial dry test length of the sample.

Each sample is thoroughly wetted by submerging the sample in distilled water for 30 seconds in a water bath. Each sample is removed from the water bath and immediately supported to hang vertically so that a line through the two marks is generally vertical. The wet sample is supported such that the support does not interfere with extension between the two marks (e.g. with a clip which does not contact the sample between the two marks). The wet test length of the sample is the distance between the two marks. The distance is measured within 30 seconds of removing the sample from the water bath.

For each sample, the sample wet extension is calculated as

Sample Wet Extension=(wet test length−initial dry test length)/ (initial dry test length)×100

For example, for a measured wet test length of 6.5 inches and an initial dry test length of 5.0 inches, the wet extension is ((6.5−5)/5)×100=30 percent.

The wet extensibility of the samples is the average of 8 calculated values of sample wet extension.

The wet caliper to dry caliper ratio is measured using a Thwing-Albert Instrument Co. Electronic Thickness Tester Model II, using the following procedure. Samples are conditioned at 70 degrees Fahrenheit and 50 percent relative humidity for two hours prior to testing.

The dry caliper of the article 20 is measured, for eight samples, using a confining pressure of 95 grams per square inch and a load foot having a diameter of 2 inches. For each sample, the caliper is measured with the load foot centered on an unbonded region of the first ply 100. The eight caliper measurements are averaged to provide an average dry caliper.

Each sample is then wetted by submerging the sample in a distilled water bath for 30 seconds. The caliper of the wet sample is measured within 30 seconds of removing the sample from the bath. The wet caliper is measured in the same location in which the dry caliper was previously measured. The eight wet caliper measurements are averaged to provide an average wet caliper. The wet caliper to dry caliper ratio is the average wet caliper divided by the average dry caliper.

Figure 12:
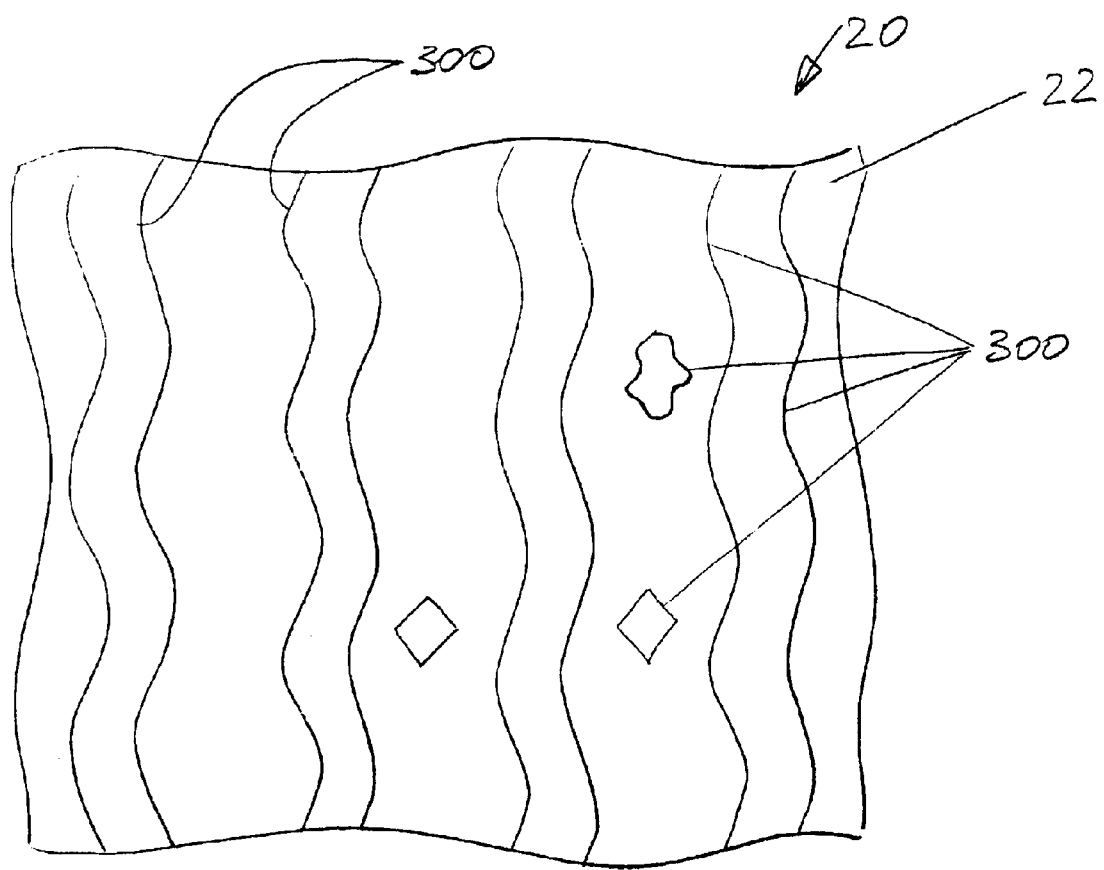
FIG. 12 is a schematic plan view of another embodiment of the article 20, comprising parallel lines of coating.

It is to be understood that the parallel lines of coating 300 need not be linear. As shown in FIG. 12, the parallel lines of adhesive 300 can comprise curved or sinusoidal lines, or lines having any other configuration, as long as at least portions of these lines are parallel. Also, the lines of coating 300 need not be continuous throughout the entire length of the article 20. The lines of coating 300 can be interrupted or otherwise comprise portions of other discontinuous patterns, as schematically shown in FIG. 12.

What is claimed is:

1. A single-ply disposable fibrous article consisting of:
   a foreshortened, wet-extensible ply having a surface topography exhibiting regions of minimum and maximum calipers comprising creping ridges, wherein the creping ridges are oriented in a first direction; and
   a coating bonded to the foreshortened ply, the coating defining bonded regions and a plurality of unbonded regions in the foreshortened ply;
   wherein the minimum caliper is coincident the bonded regions; and
   wherein the coating comprises a plurality of mutually parallel lines of adhesive extending in a second direction substantially perpendicular to the first direction.

2. The article of claim 1, wherein the coating is selected from the group consisting adhesives, thermoplastic adhesives, latexes, or any combination thereof.

3. The article of claim 1, wherein the foreshortened, wet-extensible ply comprises cellulosic fibers.

4. The article of claim 1, wherein the foreshortened, wet-extensible ply is apertured.

5. The article of claim 1, wherein the foreshortened, wet-extensible ply comprises a nonwoven material.

6. The article of claim 1, wherein the foreshortened, wet-extensible ply has a wet caliper and a dry caliper, and wherein a ratio of the wet caliper to dry caliper is at least 1.1.

7. A disposable article comprising:
   a first ply joined to a second ply in a face-to-face relationship by an adhesive coating having a pattern of a plurality of mutually parallel lines, at least one of the first and second plies having a wet-extensibility;
   the first ply having a surface topography exhibiting regions of minimum and maximum calipers and a first wet-extensibility;
   the second ply having a surface topography exhibiting regions of minimum and maximum calipers and a second wet-extensibility;
   the adhesive coating defining bonded regions coincident the minimum caliper regions, and a plurality of unbonded regions disposed between the plurality of mutually parallel lines; and
   wherein the first wet-extensibility is substantially equal to the second wet-extensibility.

8. The article of claim 7, wherein the coating comprises lines oriented substantially parallel to the wet-extensibility of the at least one of the first and second plies.

9. The article of claim 7, wherein at least one of the first and second plies comprises cellulosic fibers, starch fibers, or a combination thereof.

10. The article of claim 7, wherein at least one of the first and second plies comprises a dry-creped ply.

11. The article of claim 7, wherein at least one of the first and second plies comprises a plurality of apertures.

12. The article of claim 7, wherein at least one of the first and second plies comprises a synthetic nonwoven material.

13. The article of claim 7, wherein the coating comprises ethylene vinyl acetate.

14. The article of claim 7, wherein the first ply comprises cellulosic paper and the second ply comprises nonwoven material.

15. The article of claim 7, wherein at least one of the first wet-extensibility and the second wet-extensibility is at least 20%.

16. The article of claim 7, wherein at least one of the first ply and the second ply has a wet caliper and a dry caliper, and wherein a ratio of the wet caliper to dry caliper is at least 1.1.

17. The article of claim 7 wherein at least one of the first ply and the second ply comprises creping ridges.

* * * * *